US010673648B1

(12) United States Patent
Viljoen et al.

(10) Patent No.: US 10,673,648 B1
(45) Date of Patent: Jun. 2, 2020

(54) NETWORK INTERFACE DEVICE THAT SETS AN ECN-CE BIT IN RESPONSE TO DETECTING CONGESTION AT AN INTERNAL BUS INTERFACE

(71) Applicant: Netronome Systems, Inc., Santa Clara, CA (US)

(72) Inventors: Nicolaas J. Viljoen, Sunnyvale, CA (US); Johan Moraal, Cape Town (ZA); Michael J. Rapson, Cape Town (ZA)

(73) Assignee: Netronome Systems, Inc., Santa Clara, CA (US)

( * ) Notice: Subject to any disclaimer, the term of this patent is extended or adjusted under 35 U.S.C. 154(b) by 0 days.

(21) Appl. No.: 16/358,514

(22) Filed: Mar. 19, 2019

Related U.S. Application Data

(60) Provisional application No. 62/694,967, filed on Jul. 6, 2018.

(51) Int. Cl.
*H04L 12/40* (2006.01)
*G06F 13/42* (2006.01)
*H04L 12/823* (2013.01)
*H04L 29/06* (2006.01)
*H04L 12/801* (2013.01)

(52) U.S. Cl.
CPC ...... H04L 12/4013 (2013.01); G06F 13/4221 (2013.01); H04L 12/40071 (2013.01); H04L 47/13 (2013.01); H04L 47/32 (2013.01); H04L 69/163 (2013.01); *G06F 2213/0026* (2013.01); *G06F 2213/0062* (2013.01); *G06F 2213/28* (2013.01)

(58) Field of Classification Search
CPC ............ G06F 13/4221; H04L 12/4013; H04L 12/40071; H04L 47/32; H04L 69/163
See application file for complete search history.

(56) References Cited

U.S. PATENT DOCUMENTS

| | | | | |
|---|---|---|---|---|
| 9,444,754 | B1* | 9/2016 | Noureddine | ............ H04L 47/35 |
| 2011/0075563 | A1* | 3/2011 | Leung | ..................... H04L 12/66 |
| | | | | 370/236 |
| 2011/0170408 | A1* | 7/2011 | Furbeck | .................. H04L 47/10 |
| | | | | 370/230 |
| 2014/0244888 | A1* | 8/2014 | Kallickal | ............ G06F 13/4022 |
| | | | | 710/313 |
| 2017/0180261 | A1* | 6/2017 | Ma | .......................... H04L 47/25 |
| 2017/0272372 | A1* | 9/2017 | Gafni | ..................... H04L 47/32 |

* cited by examiner

*Primary Examiner* — Glenn A. Auve
(74) *Attorney, Agent, or Firm* — Imperium Patent Works LLP; T. Lester Wallace

(57) ABSTRACT

A network device includes a Network Interface Device (NID) and multiple servers. Each server is coupled to the NID via a corresponding PCIe bus. The NID has a network port through which it receives packets. The packets are destined for one of the servers. The NID detects a PCIe congestion condition regarding the PCIe bus to the server. Rather than transferring the packet across the bus, the NID buffers the packet and places a pointer to the packet in an overflow queue. If the level of bus congestion is high, the NID sets the packet's ECN-CE bit. When PCIe bus congestion subsides, the packet passes to the server. The server responds by returning an ACK whose ECE bit is set. The originating TCP endpoint in turn reduces the rate at which it sends data to the destination server, thereby reducing congestion at the PCIe bus interface within the network device.

21 Claims, 13 Drawing Sheets

SET ECN-CE BIT UPON DETECTION OF PCIe CONGESTION EVENT

SYSTEM INVOLVING NETWORK INTERFACE DEVICE THAT SETS ECN BIT UPON PCIe CONGESTION

NETWORK FLOW PROCESSOR OF
THE NETWORK INTERFACE DEVICE

INGRESS MAC ISLAND

INGRESS NBI ISLAND

ME ISLAND

MU ISLAND

EGRESS PCIe ISLAND

PCIe BLOCK IN MORE DETAIL

EGRESS NBI ISLAND

EGRESS MAC ISLAND

FORMAT OF IP PACKET

FORMAT OF ACK PACKET

SET ECN-CE BIT UPON DETECTION OF PCIe CONGESTION EVENT

US 10,673,648 B1

NETWORK INTERFACE DEVICE THAT SETS AN ECN-CE BIT IN RESPONSE TO DETECTING CONGESTION AT AN INTERNAL BUS INTERFACE

CROSS REFERENCE TO RELATED APPLICATION

This application claims the benefit under 35 U.S.C. § 119 from U.S. Provisional Application No. 62/694,967 entitled "Network Interface Device That Sets ECN Bit In A Packet Before Forwarding To Its Host Across A PCIe Bus," filed on Jul. 6, 2018, by Nicolaas J. Viljoen. The disclosure of the foregoing document is incorporated herein by reference.

SUMMARY

A network device, such as one that serves personalized recommendations to requesting web tier servers, includes a Network Interface Device (NID) and a plurality of servers. The NID has a high-speed network port through which is connects to a network. The NID can receive and output IP packets through this high-speed network port. The NID also has a plurality of Peripheral Component Interconnect Express (PCIe) interfaces. Each of these PCIe interfaces typically includes a PCIe slot connector (female) for engaging with the PCIe card edge connector (male) of a corresponding one of the servers. Each of the servers is coupled to the NID via a corresponding one of the plurality of PCIe interfaces on the NID.

In one operational example, an IP packet is received onto the network device via the high-speed network port. This IP packet is destined for one of the servers. A PCIe bus congestion condition is, however, detected on the PCIe bus across which the IP packet would have to pass on its way from the NID to the destination server. Rather than forwarding the IP packet across the congested PCIe bus to the server which may lead to discarded packets, the IP packet remains stored on the NID and a pointer to the IP packet is added onto the tail of a novel "PCIe transmit overflow queue".

The PCIe transmit overflow queue is part of a PCIe interface of the NID. The PCIe interface includes the PCIe transmit overflow queue, a PCIe transmit work queue, a PCIe card edge connector, and related circuitry.

If the number of pointers in the PCIe transmit overflow queue exceeds an action threshold value T1, then the NID sets the ECN-CE (Explicit Congestion Notification Congestion Experienced) bit of the IP packet. When there is available bandwidth across the PCIe bus to the server, the IP packet is sent across the PCIe bus to the destination server and the pointer to the IP packet is removed from the PCIe transmit overflow queue. A protocol processing stack in the server receives the IP packet, and in accordance with the TCP protocol generates an ACK packet. The ACK packet passes back across the PCIe bus to the NID, through the NID to the high-speed network port, and to the TCP endpoint from which the IP packet originated. If the ECN-CE bit in the IP packet was set by the PCIe interface of the NID before the IP packet was sent to the server, then the ECE (ECN-Echo) bit in the returning ACK packet is set. The TCP connection endpoint that sent the original IP packet to the network device receives the ACK packet and uses the ECE bit in standard TCP fashion in accordance with the negotiated TCP congestion control algorithm to reduce the rate of data it transmits to the network device across the TCP connection. Reducing the rate of data transfer in this way prevents the congested PCIe interface internal to the network device from dropping packets due to its being overloaded. During the time that the congestion control feedback loop is taking effect, in-flight IP packets (IP packets that are in-flight from the originating TCP endpoint to the network device) are stored on the NID and pointers to them are pushed onto the PCIe transmit overflow queue. Due to this buffering, IP packets are not dropped.

In a case in which the network device has multiple PCIe interfaces and multiple servers, it is possible that only one of the PCIe interfaces is congested. Because the data rate for the particular TCP connection is reduced, data rates across the other PCIe interfaces to the other servers need not be reduced. Importantly, the ECN-CE bit is set by the NID as a result of detecting a PCIe congestion condition of a particular PCIe interface deep within the network device. This congestion condition is not a condition of the high-speed network port and network interface at the edge of the network device.

In some embodiments, a PCIe transmit overflow queue also has an associated drop threshold value T2. When a pointer is to be added onto the tail of the PCIe transmit overflow queue, if the number of pointers that would be in the PCIe transmit overflow queue would exceed the drop threshold value T2, then the pointer is not added to the queue and the IP packet is dropped. Dropped means that the IP packet is not transferred to the server, and the pointer to the IP packet is deleted from the queues of the PCIe interface. Memory space on the NID that was used to buffer the IP packet is freed up for use in storing other information.

In some embodiments, a PCIe interface has multiple PCIe transmit overflow queues. Each of these overflow queues may have its own action threshold value T1 and its own drop threshold value T2. Each of the overflow queues may perform its own different action if its threshold value T1 is exceeded. For example, if the PCIe interface detects a PCIe congestion condition such that it will not try to transfer the IP packet across the associated PCIe bus but rather it will add a pointer to the IP packet into an overflow queue, then the PCIe interface may determine which PCIe transmit overflow queue to put the pointer into based on other information about the IP packet, such as for example the ECN-CT bit of the IP packet and/or the DSCP bits of the IP packet. In one example, one of the PCIe transmit overflow queues is reserved for pointers to IP packets of ECN-capable traffic, whereas another of the PCIe transmit overflow queues is reserved for pointers to IP packets of non-ECN-capable traffic.

Further details and embodiments and methods and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
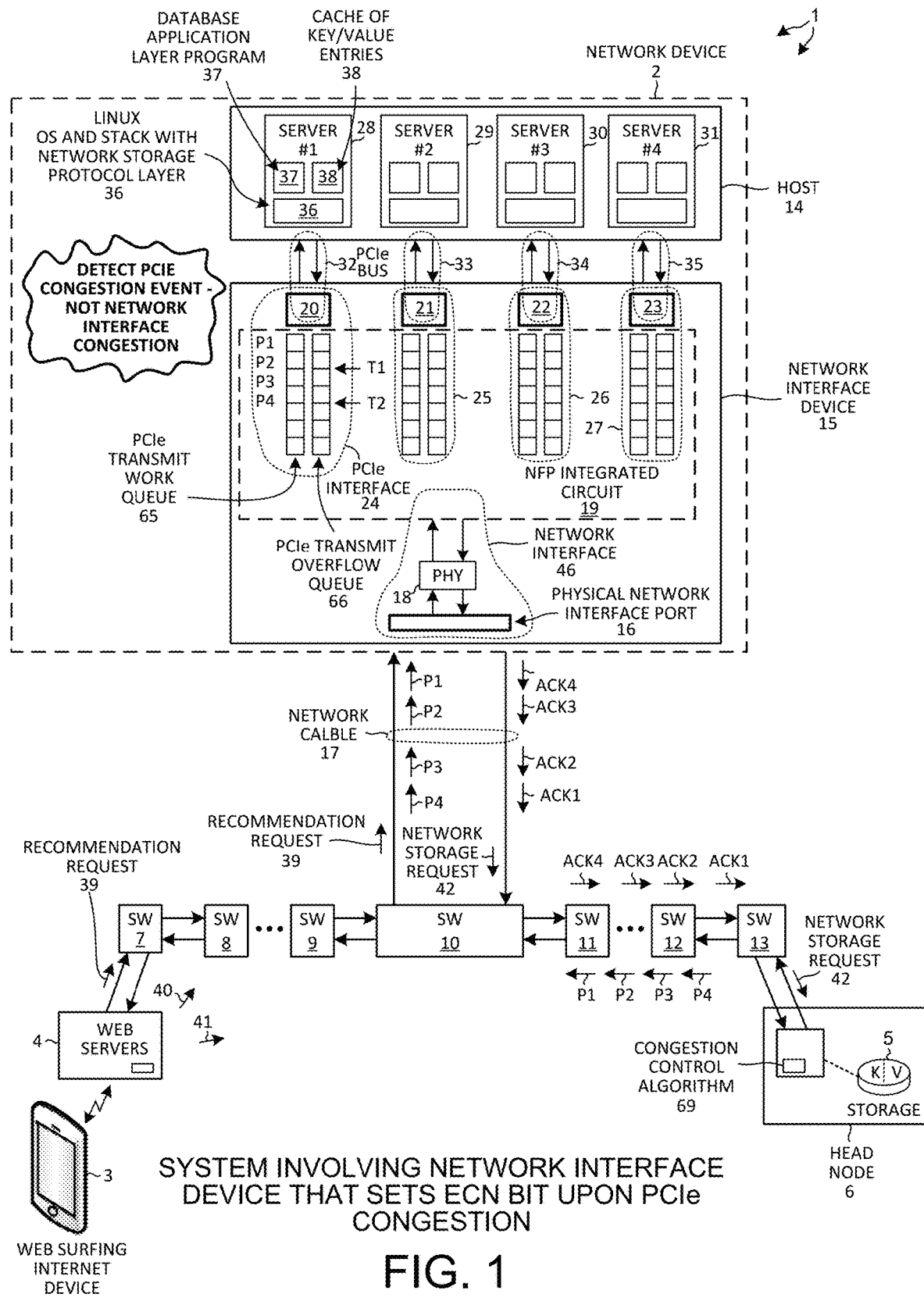
FIG. 1 is a diagram of system in accordance with the present invention.

FIG. 1 is a diagram of system 1 in accordance with the present invention. The system 1 involves a network device 2, a device 3 having a browser usable to surf the Internet, a set of web servers 4, head node 6, and a set of switches/routers and/or other network devices 7-13. The switches/routers and/or other network devices 7-13 represent switches, routers and other components of one or more networks that together interconnect the web servers 4, the network device 2, and the head node 6. The head node 6 is a server which includes a data storage device 5, such as a hard disk or a flash drive.

The network device 2 includes a host portion 14 and a Network Interface Device (NID) or NID portion 15. The host portion 14 includes a plurality of servers. In one example, the NID 15 is a Network Interface Card (commonly referred to as a NIC). NID 15 includes one or more physical network interface ports. In the example illustrated, NID 15 has one physical network interface port 16. This physical network interface port 16 and the network interface circuitry associated with it can handle high speed network traffic at a rate of 50 Gbps (gigabits per second) or higher both into the NID 15 and out of the NID 15.

In one example, the physical network interface port 16 is a RJ-45 female connector. The plug on one end of a network cable 17 can plug into this RJ-45 female connector. In another example, the physical network interface port 16 is a QSFP module that has a socket. The plug on an end of an optical fiber network cable 17 can plug into this QSFP module socket. The physical network interface port 16, the PHY 18, and network interface circuitry on the NFP integrated circuit 19 together form a network interface 46.

NID 15 further includes a PHY transceiver integrated circuit 18, a Network Flow Processor (NFP) integrated circuit 19, and four Peripheral Component Interconnect Express (PCIe) female card edge connectors or slots 20-23. Together the NFP integrated circuit 19 and the four PCIe female card edge connectors 20-23 constitute four PCIe bus interfaces 24-27.

The host 14 includes multiple identical server computers 28-31. Executing on each server computer is an instance of the Linux operating system that includes a protocol processing stack. This protocol processing stack includes a link layer, an IP layer, a TCP layer, and a network attached storage protocol layer. Examples of the network attached storage protocol layer include an NBD layer, an NVME, or an iWARP layer. Also executing on each server is one or more threads of an application layer database program. A thread of the application layer database program handles incoming requests for data, and manages a local cache of that key/value entries, and interacts with and updates a remotely located complete key/value entry store. In the example illustrated in FIG. 1, there is only one thread of this application layer database program executing on each server, and each thread maintains its own cache of the key/value store. Accordingly, the PCIe bus interface 24 is the PCIe bus interface for the thread 37 of the application layer database program executing on server 28.

Each server has a PCIe card edge connector (male) that plugs into a corresponding one of the four PCIe card edge slot connectors (female) 20-23 on the NID 15. The arrows in the diagram of FIG. 1 represent the signal traces of the four PCIe3.0×2 lane (or ×4 lane) buses 32-35. PCIe bus 32 couples the PCIe interface 24 to the server 28. PCIe bus 33 couples the PCIe interface 25 to the server 29. PCIe bus 34 couples the PCIe interface 26 to the server 30. PCIe bus 35 couples the PCIe interface 27 to the server 31.

It is a significant advantage of the network device 2 of FIG. 1 that an inexpensive type of server is used to implement the servers 28-31. The card edge PCIe interface of this inexpensive server has a PCIe transfer throughput that is limited, due to the construction of the server, to about 13 Gbps into (or 26 Gbps if ×4) the server and to about 13 Gbps out of (or 26 Gbps if ×4) the server. The three blocks 36-38 illustrated in FIG. 1 represent the Linux operating system with its protocol processing stack, the thread of the application layer database program that runs on server 28, and the local cache of key/value entries for that thread, respectively.

Figure 2:
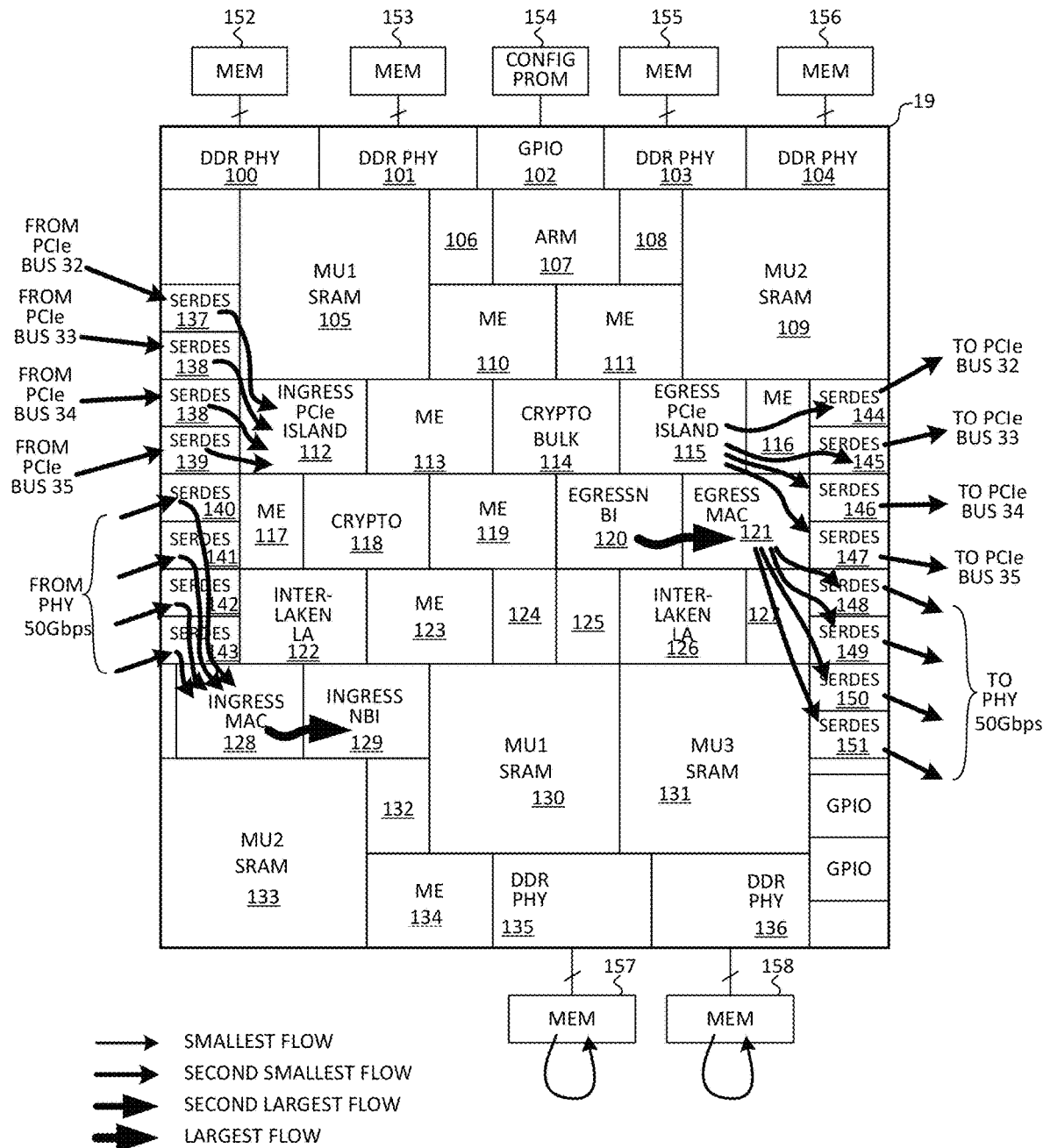
FIG. 2 is a more detailed diagram of the NFP integrated circuit of the NID of FIG. 1.

FIG. 2 is a more detailed diagram of the NFP integrated circuit 19 of FIG. 1. The NFP integrated circuit 19 has multiple islands and blocks of circuitry 100-151. The NFP integrated circuit 19 uses external memory devices 152-158 to store data. Information received onto the NFP 19 from PCIe bus 32 is received onto SERDES 137, and information passing out of NFP 19 to PCIe bus 32 is output via SERDES 144. Information received onto the NFP 19 from PCIe bus 33 is received onto SERDES 138, and information passing out of NFP 19 to PCIe bus 33 is output via SERDES 145. Information received onto the NFP 19 from PCIe bus 34 is received onto SERDES 138, and information passing out of NFP 19 to PCIe bus 34 is output via SERDES 146. Information received onto the NFP 19 from PCIe bus 35 is received onto SERDES 139, and information passing out of NFP 19 to PCIe bus 35 is output via SERDES 147.

IP packet network traffic received onto the network device 2 from network cable 17 passes through the physical network interface port 16, through the PHY integrated circuit 18, and into the NFP integrated circuit 19 via SERDES 140-143. The IP packet network traffic then passes through ingress MAC island 128. The IP packets are stored (i.e., are buffered) either on the NFP integrated circuit 19 in internal memory unit MU SRAM block 131 and/or in external DRAM memory 157-158. Ingress NBI island 129 analyzes and classifies the incoming IP packets. Pointers that point to where the actual IP packets are stored are maintained.

IP packet data to be output from the network device 2 to the network cable 17 is read from memory (from internal SRAM and/or external DRAM) where it was buffered, passes through egress NBI island 120, through egress MAC island 121, out of SERDES 148-151, through PHY integrated circuit 18, through physical network interface port 16, and to the network cable 17.

IP packet data received onto the network device 2 from a PCIe bus passes through the PCIe slot of the bus, passes into the NFP integrated circuit 19 via the particular one of the SERDES 137-139 that is coupled to that PCIe bus, passes through ingress PCIe island 112, and is then stored into memory (internal SRAM and/or external DRAM). Pointers that point to where the actual IP packet is stored are maintained.

IP packet data to be output from the network device 2 to a PCIe bus is read out of memory (internal SRAM and/or external DRAM), and passes through egress PCIe island 115, and then passes out of the NFP integrated circuit 19 through the particular one of the SERDES 144-147 that is coupled to the PCIe bus, and then passes across the PCIe slot of the particular PCIe bus.

Figure 3:
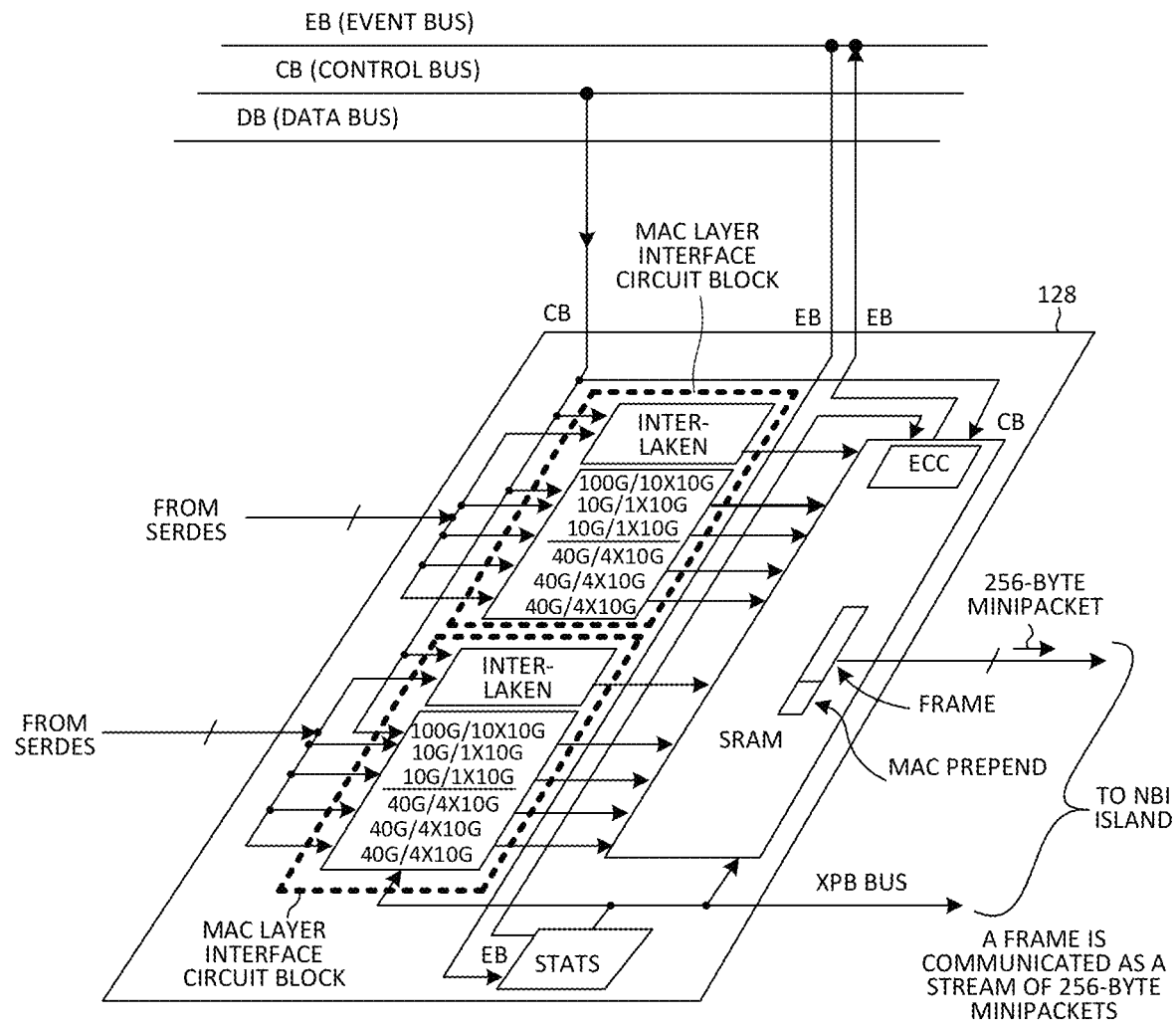
FIG. 3 is a more detailed diagram of the ingress MAC island in the NFP integrated circuit of the NID of FIG. 2.

FIG. 3 is a more detailed diagram of the ingress MAC island 128 of FIG. 2. The four SERDES 140-143 and the ingress MAC island 128 are parts of the "network interface" 46 pictured in FIG. 1. For more detailed information on the ingress MAC island 128, see: 1) U.S. Pat. No. 9,264,256, entitled "Merging PCP Flows As They Are Assigned To A Single Virtual Channel", filed Jul. 1, 2014, by Joseph M. Lamb; and 2) U.S. Pat. No. 9,515,946, entitled "High-Speed Dequeuing Of Buffer IDs In Frame Storing System", filed Jul. 1, 2014, by Joseph M. Lamb (the entire subject matter of these two patents is hereby incorporated by reference).

Figure 4:
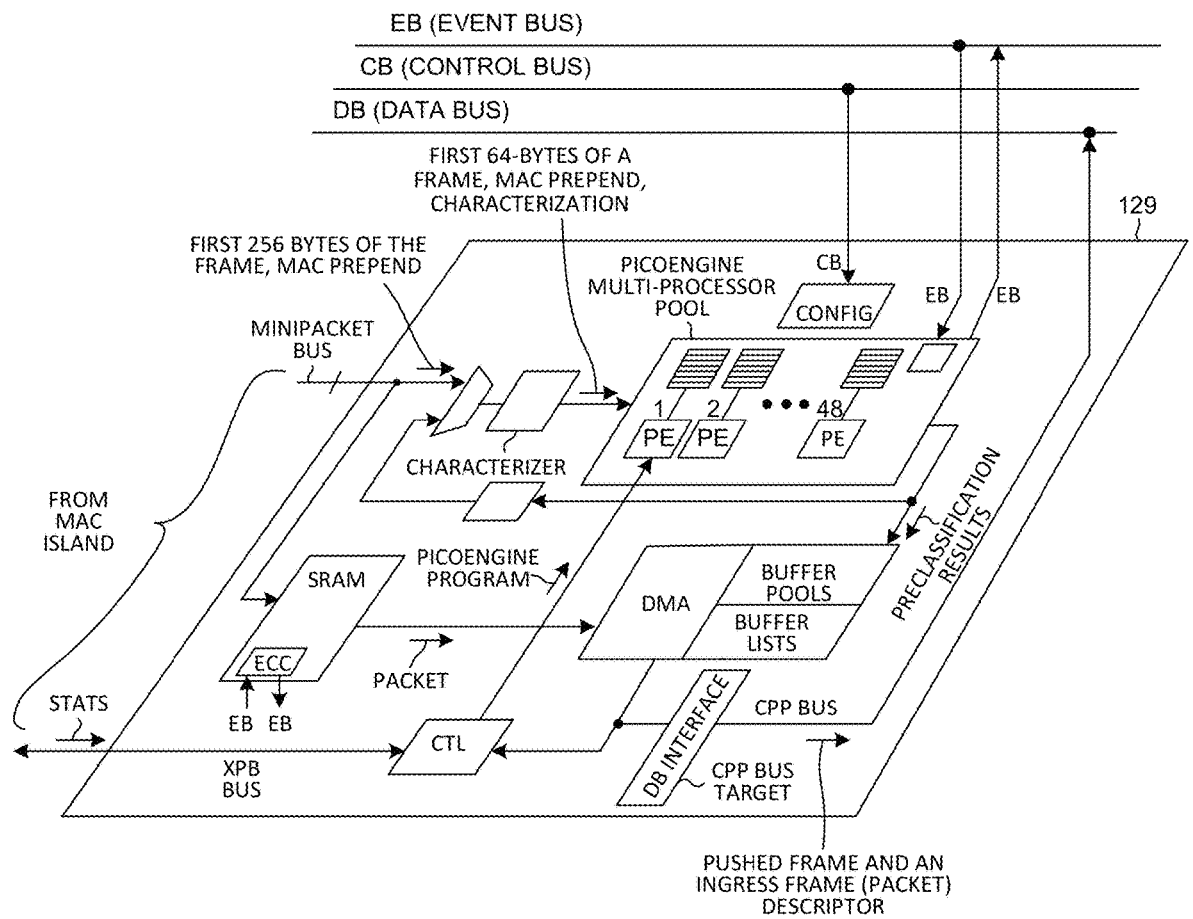
FIG. 4 is a more detailed diagram of the ingress NBI island in the NFP integrated circuit of the NID of FIG. 2.

FIG. 4 is a more detailed diagram of the ingress NBI island 129 of FIG. 2.

Figure 5:
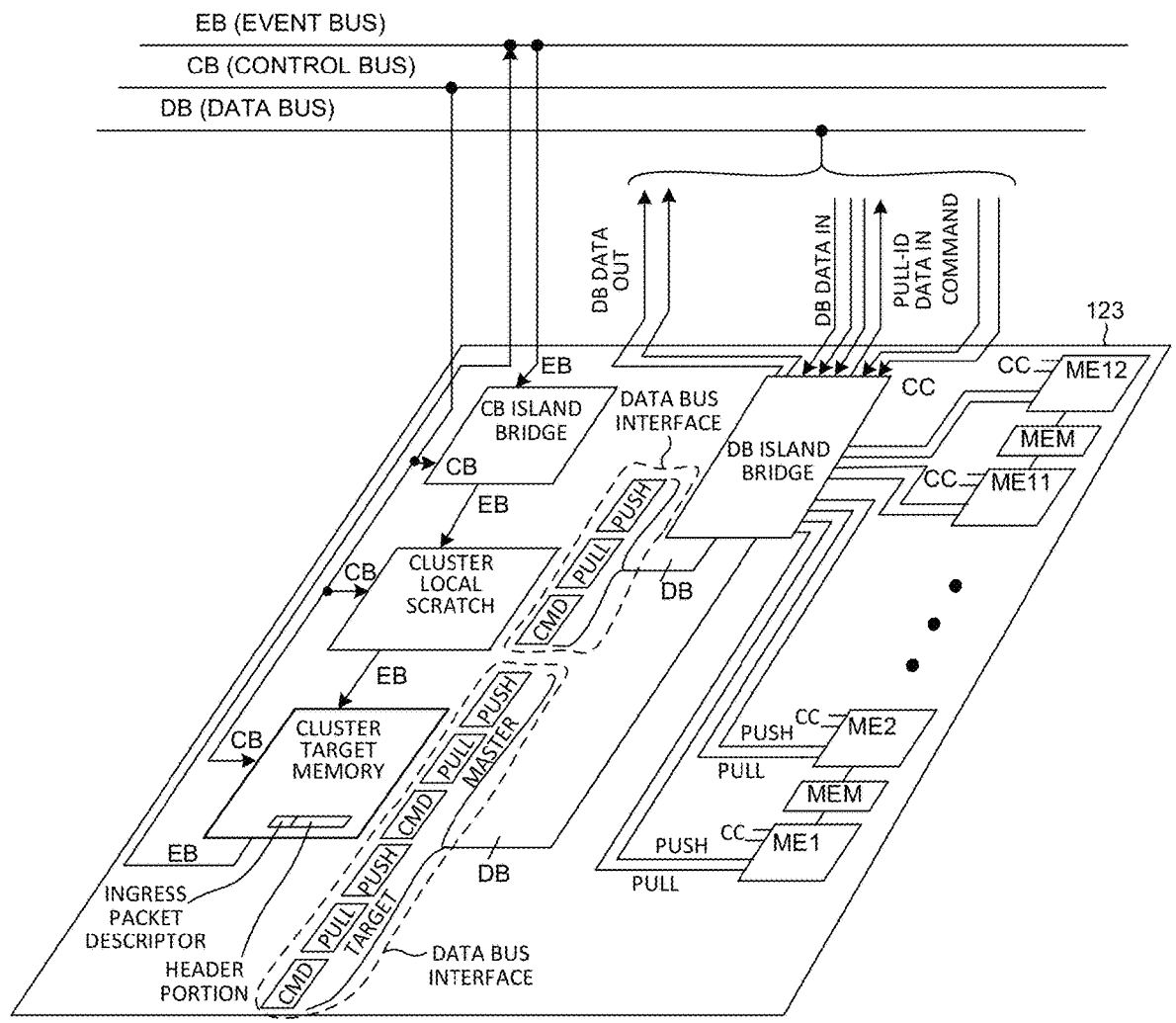
FIG. 5 is a more detailed diagram of the ME (MicroEngine) island in the NFP integrated circuit of the NID of FIG. 2.

FIG. 5 is a more detailed diagram of the ME (MicroEngine) island 123 of FIG. 2.

Figure 6:
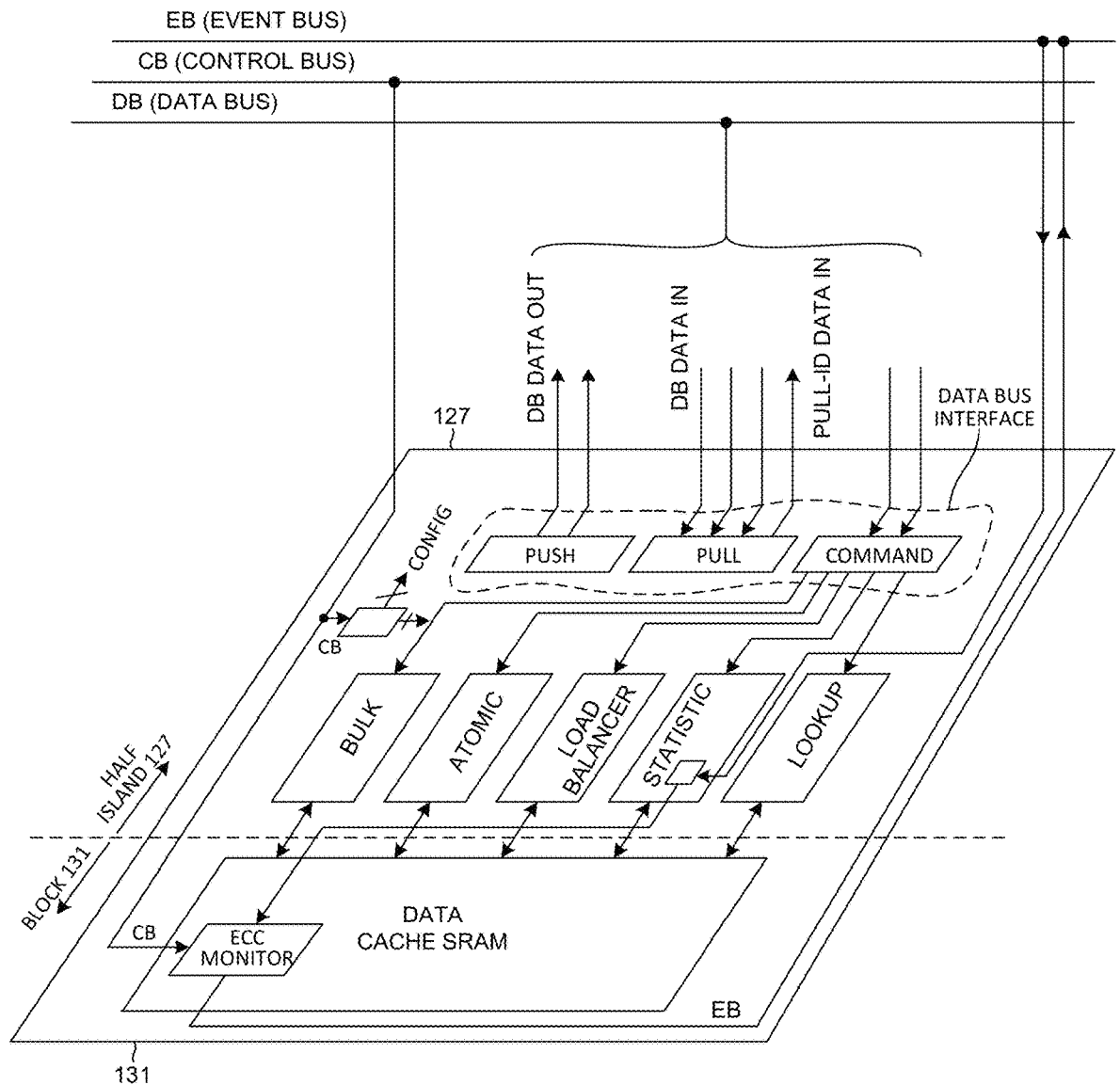
FIG. 6 is a more detailed diagram of the memory control island and associated the Memory Unit island in the NFP integrated circuit of the NID of FIG. 2.

FIG. 6 is a more detailed diagram of the memory control island 127 and its associated MU (Memory Unit) SRAM island 131.

Figure 7:
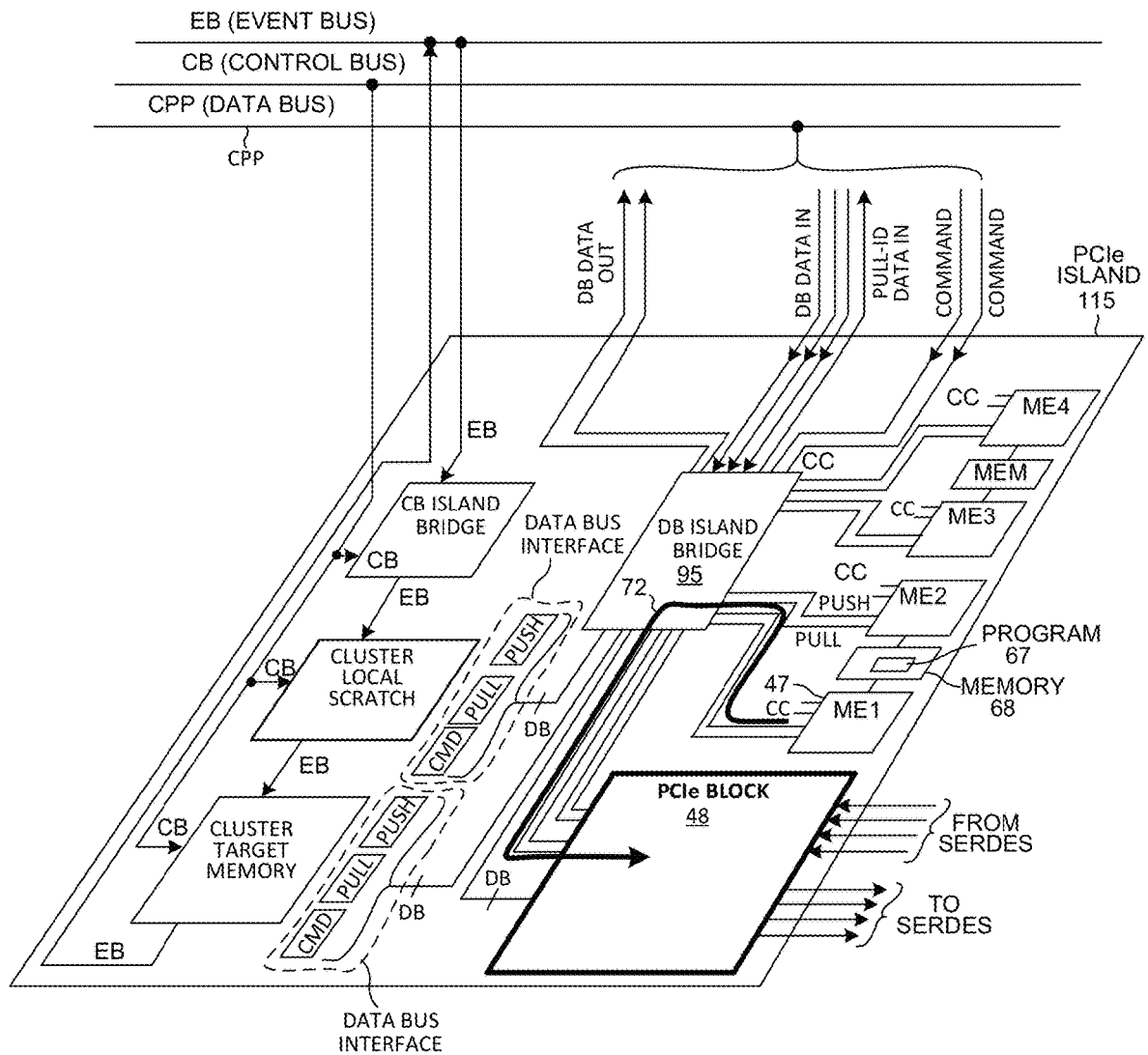
FIG. 7 is a more detailed diagram of the egress PCIe island in the NFP integrated circuit of the NID of FIG. 2.

FIG. 7 is a more detailed diagram of the egress PCIe island 115 of FIG. 2. The egress PCIe island 115 includes a ME processor 47 and a PCIe block 48.

Figure 8:
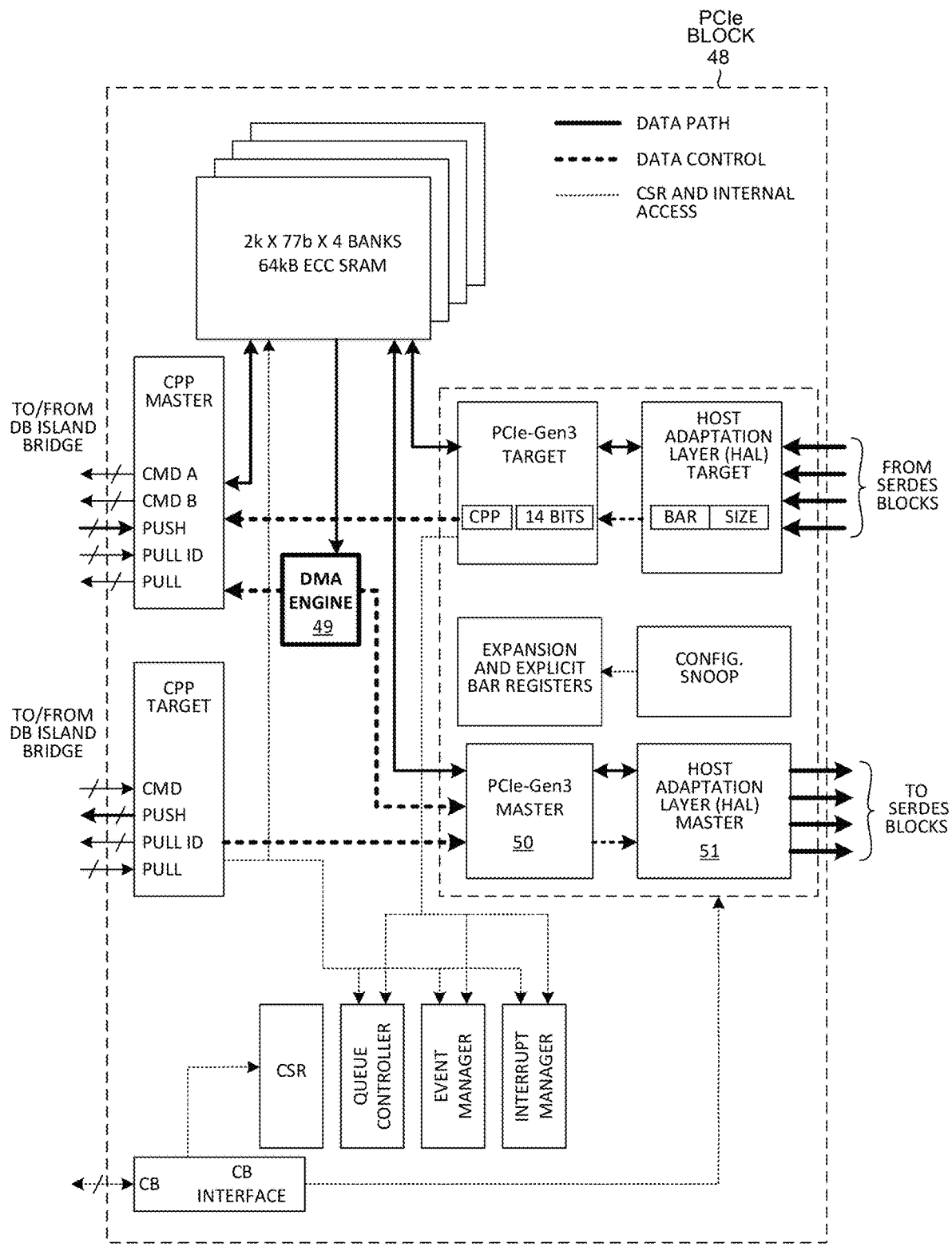
FIG. 8 is a more detailed diagram of the PCIe block within the egress PCIe island of FIG. 7.

FIG. 8 is a more detailed diagram of the PCIe block 48 within the egress PCIe island 115 of FIG. 2. The PCIe block 48 includes a DMA engine 49, a PCIe-Gen3 Master 50, and a Host Adaptation Layer (HAL) Master 51. For more detailed information on the egress PCIe island 115, see: U.S. Pat. No. 9,753,883, entitled "Network Interface Device That Maps Host Bus Writes Of Configuration Information For Virtual NIDs Into A Small Transactional Memory", filed Feb. 4, 2014, by Gavin J. Stark, et al. (the entire subject matter of which is hereby incorporated by reference).

Figure 9:
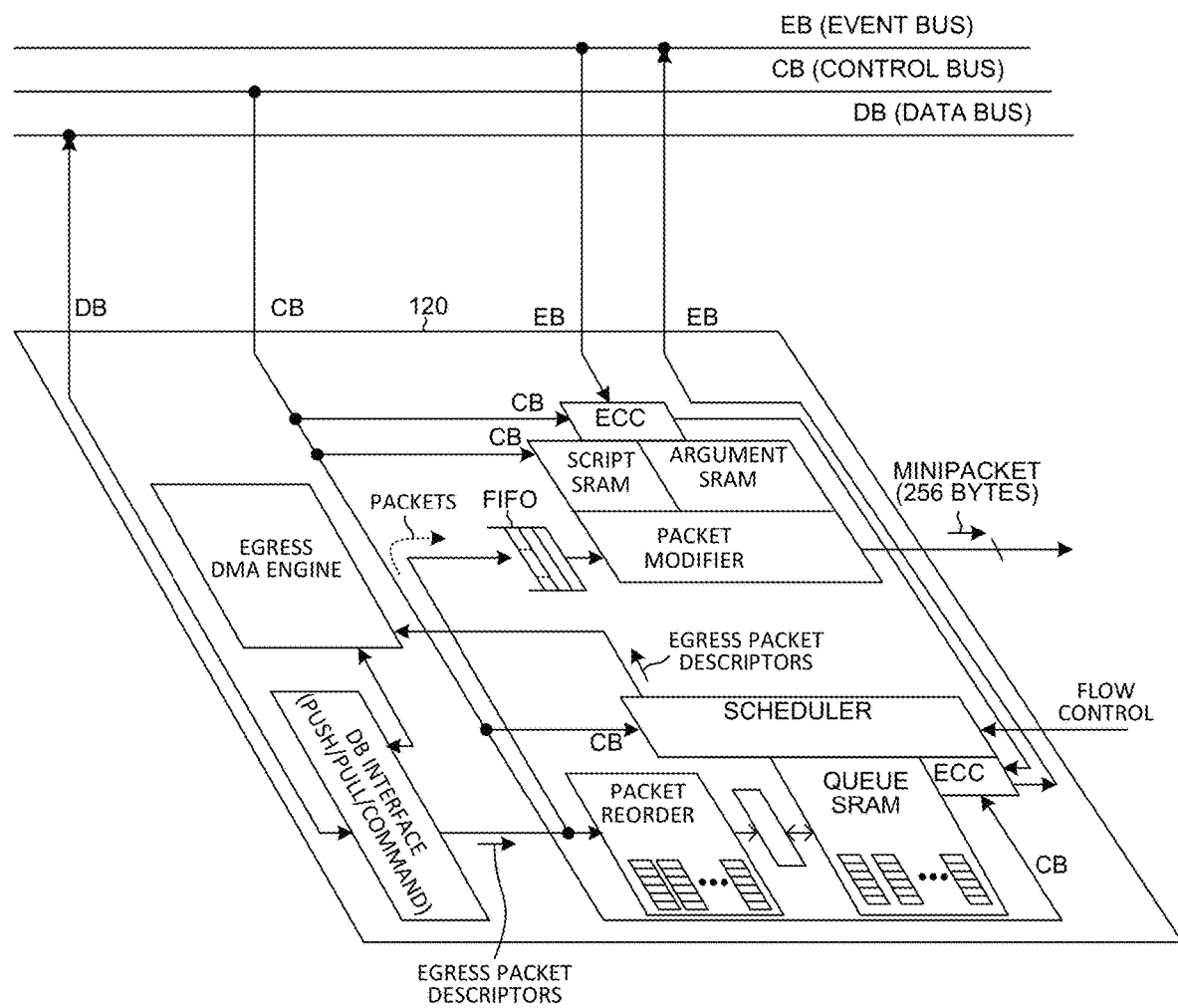
FIG. 9 is a more detailed diagram of the egress NBI island in the NFP integrated circuit of the NID of FIG. 2.

FIG. 9 is a more detailed diagram of the egress NBI island 120 of FIG. 2.

Figure 10:
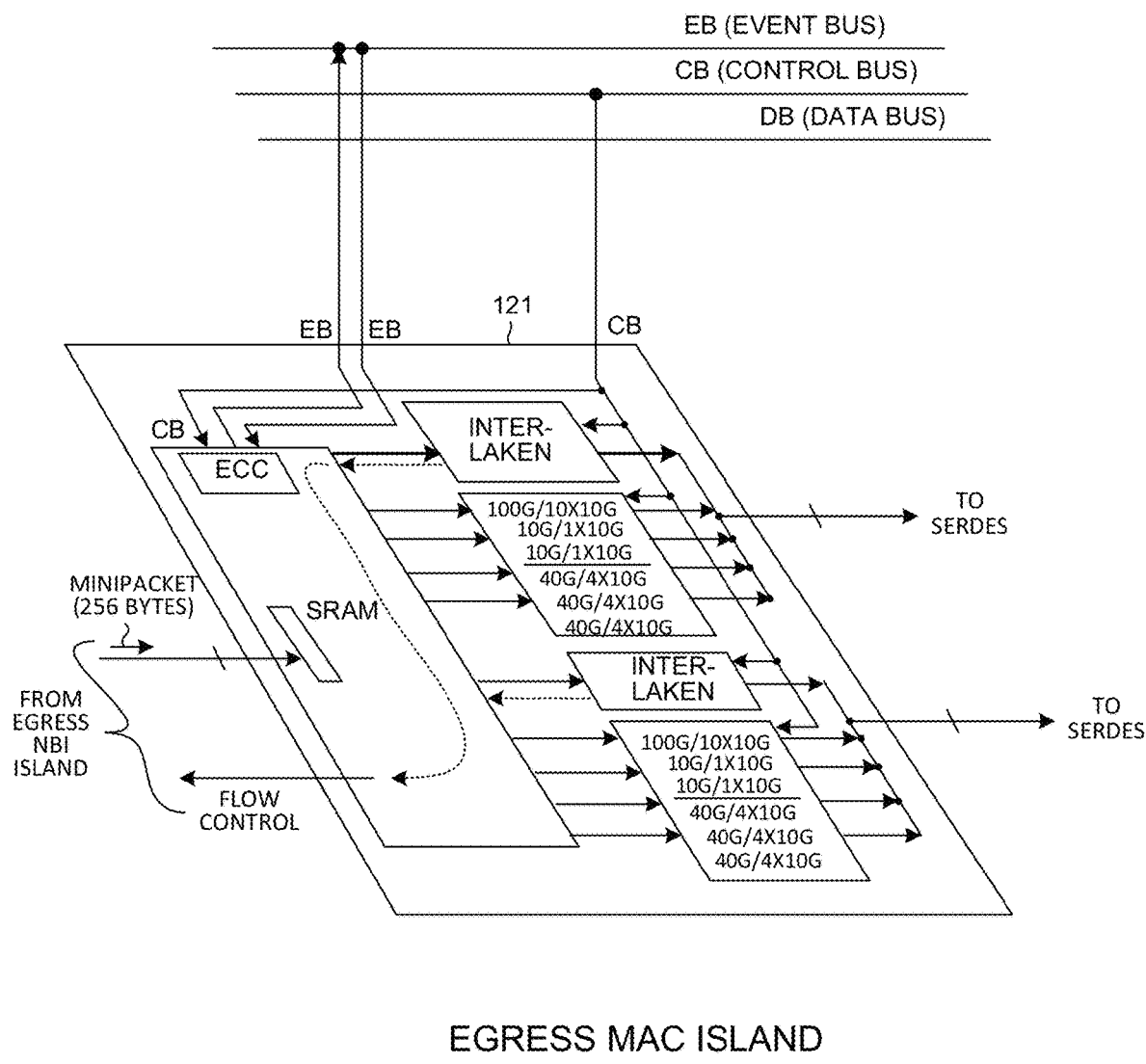
FIG. 10 is a more detailed diagram of the egress MAC island in the NFP integrated circuit of the NID of FIG. 2.

FIG. 10 is a more detailed diagram of the egress MAC island 121 of FIG. 2. The egress MAC island 121 and its associated four SERDES 148-151 are also parts of the "network interface" 46 pictured in FIG. 1.

Network device 2 is actually a server that serves information to a requesting web tier server. In one operational example of the system of FIG. 1, a user uses the browser of the internet-connected device 3 to access a web page. In one example, this web page includes an information feed. As the user scrolls down and through the information feed, multiple requests are sent out from the web servers 4 to obtain data that is to be inserted back into various parts of the information feed. Such a request may, for example, be a request for personalized information that is specifically directed to the particular user who is using the mobile device. In the illustration of FIG. 1, these various requests are represented by the arrows 39-41. One example of such a request is recommendation request 39 for a data stored in a database of key/value pairs. This recommendation request 39 includes a key. The key indicates the individual person who is using the web surfing internet device. The value of the key/value pair is a set of data that is targeted to, or is related to, the individual person identified by the key. The recommendation request 39 including the key passes through a network or networks (represented by switches/routers 7, 8, 9 and 10) and into the network device 2 via the physical network interface port 16, through the NFP integrated circuit 19, across the PCIe bus 32, and to the server 28 of the host 14, and to the thread 37 of the database application layer program executing on the server 28.

The NFP integrated circuit 19 implements a load balancer that directs recommendation requests received onto network interface device 15 via the network interface 46 to an appropriate one of the threads of the application layer database program. This process is sometimes called Receive Side Scaling (RSS). In the present example, the load balancer directed the incoming recommendation request 39 destined to server 28 to the executing thread 37.

As mentioned above, the thread 37 of the application layer database program maintains the local cache 38 of key/value pairs. Associated with each key/value pair is a block of data (in this case a 6 k byte block of data). If the database program determines that the 6 k byte block of data requested by the recommendation request 39 is not cached on the server 28, then it causes the requested block to be retrieved from the primary store maintained on the head node 6. To do this, it outputs a block I/O request to the network storage layer of the stack. The network storage layer is a layer above the TCP layer. The network storage layer forms the block I/O request into a network storage request 42 that includes an argument, such as an indication of an address and/or size. The lower layers of the protocol processing stack in turn form the network storage request 42 into what is referred to here colloquially as an "IP packet". The IP packet (containing the network storage request 42) includes a MAC header, an IP header, a TCP header, and a data payload. This IP packet (containing network storage request 42) is output from the stack, passes across the PCIe bus 32, through the NID 15, out of NID 15 via the physical network interface port 16, through switches/routers 10-13, and to the other TCP endpoint of the TCP connection. The other TCP endpoint of the TCP connection is in the TCP layer of the stack that is executing in the head node 6. The storage device 5 (for example, a set of hard disks) that stores the block of data to be retrieved is a part of the head node 6. The network storage request 42 includes an indication of an address and an indication of a size. The indicated 6 k byte block of data is retrieved by the head node 6, and is then sent from the head node 6 back to the server that sent the network storage request 42. The 6 k byte block of data is sent in the form of a network storage response involving several IP packets. In the present example, each IP packet carries at most 1.5 k bytes of data, so the 6 k bytes of data is broken up and is transmitted in four such packets P1, P2, P3 and P4. These IP packets are formed by the protocol processing stack executing on the head node 6, and are communicated one at a time back to the physical network interface port 16 of the NID 15. The packets P1, P2, P3 and P4 pass through the NID 15, and across the PCIe bus 32, and to the TCP endpoint in the protocol processing stack executing on the server 28. The network storage layer of the stack waits to receive all the data of the 6 k byte block. When it has all the data, it reassembles the 6 k byte block, and then supplies the 6 k byte block of data as a unit to the requesting thread 37 of the application layer database program.

Figure 11:
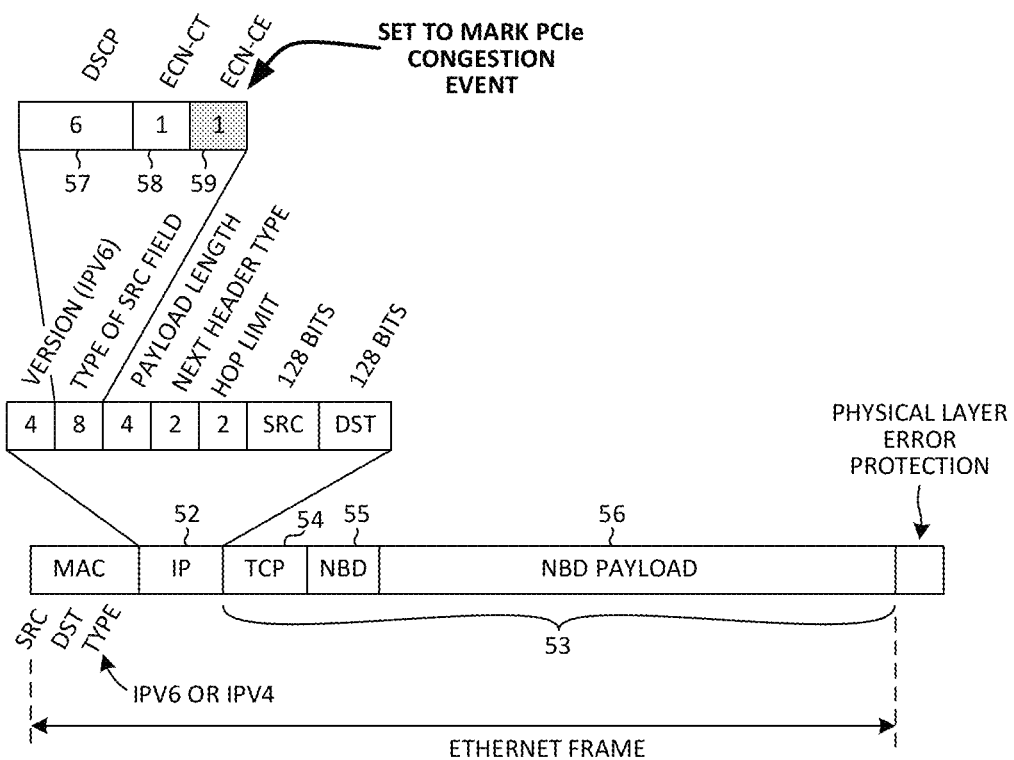
FIG. 11 is a diagram that illustrates the various fields and portions of one of the IP packets P1, P2, P3 or P4.

FIG. 11 is a diagram that illustrates the various fields and portions of one of these IP packets P1, P2, P3 or P4. The IP packet includes an IP header 52 and an IP payload 53. The IP payload 53 includes a TCP header 54, a network storage protocol (e.g. NBD) header 55 and a network storage protocol (e.g. NBD) payload 56. The network storage payload 56 is a portion of the data requested by the network storage request 42. The IP header 52 includes numerous fields, including a six-bit Differentiated Services Field Codepoints (DSCP) field 57, a one-bit ECN-CT (ECN capable transport) field 58, and a one-bit ECN-CE (ECN congestion experienced) field 59. ECN stands for "Explicit Congestion Notification". Together bits 58 and 59 are referred to in RFC 3168 as "the ECN field".

This same ECN-CE bit 59 is sometimes referred to as "ECN congestion encountered" bit, or the "ECN congestion event" bit. The ECN-CE bit 59 will be referred to here in this patent document as the "ECN congestion experienced" bit.

In accordance with the TCP/IP protocol suite, the TCP endpoint in the stack executing in the server 28 outputs an acknowledgement IP packet (an ACK) for each one of the IP packets P1, P2, P3 and P4 it receives. In the diagram of FIG. 1, the four ACKs are denoted ACK1, ACK2, ACK3 and ACK4. These ACK packets pass back across the PCIe bus, through the NFP integrated circuit 19, out of the NID 15 via the physical network interface 16, through the switches/routers 10-13, and to TCP endpoint in the stack executing on the head node 6.

Figure 12:
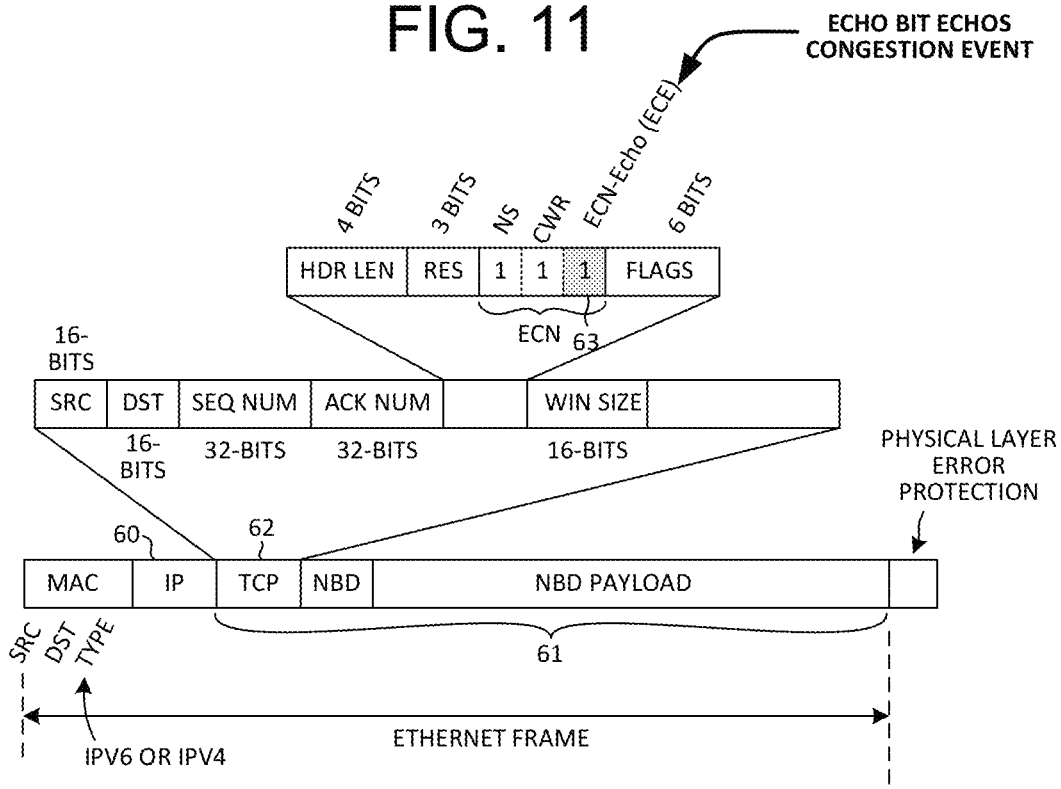
FIG. 12 is a diagram that illustrates the various fields and portions of one of the ACK packets ACK1, ACK2, ACK3 or ACK4.

FIG. 12 is a diagram that illustrates the various fields and portions of one of the ACK packets. The ACK packet includes an IP header 60 and an IP payload 61. The IP payload 61 includes a TCP header 62. The TCP header 62 in turn includes numerous fields including an ECN-Echo (ECE) bit 63.

When the TCP connection between the TCP endpoint in the stack of the operating system of the server 28 and the TCP endpoint in the stack of the head node 6 is initially set up, the two endpoints negotiate with one another and decide on a particular congestion control algorithm that they will use for that TCP connection. In the congestion control algorithm 59 used in the example of FIG. 1, the TCP endpoint in the head node 6 that is sending the data packets P1, P2, P3 and P4 to the server 28 is initially only allowed to send a certain amount of data (for example, 6 k bytes) across the TCP connection in the current TCP window. If the TCP endpoint in the head node sends these packets of this TCP window across the connection and all the ACKs for these packets are not received back in a predetermined amount of time, then this condition is determined to be a drop. When a drop is detected, the congestion control algorithm 69 decreases the size of the TCP window for the next TCP transmission window by some amount. After reducing of the TCP window, the transmitting TCP endpoint in the head node 6 will only be allowed to send the smaller amount of data across the TCP connection in the next TCP window. On the other hand, if all the ACKs for the current window are successfully received within the predetermined amount of time, then the congestion control algorithm 69 increases the TCP window for the next TCP transmission window by some amount.

When the thread 37 of the database program receives the entire 6 k byte block of data from the network storage layer of the stack, it then causes that data to be sent to the web tier server that issued the initial recommendation request 39. This transfer of data, which is another network communication from network device 2 to the web server, is not illustrated in FIG. 1. When the web server receives the data, the web server incorporates the data into the information feed. Speed is important in this retrieval of personalized data for the information feed. As the user uses the web browser and GUI interface on the device 3 to scroll down the information feed, the personalized data is to be retrieved and incorporated into the feed without perceptible delay to the user.

It is possible that one of the IP packets carrying data of a network storage response from the head node 6 to the server 28 will be dropped such that the head node 6 does not ever receive an ACK back for that IP packet. In such a condition, the head node 6 waits a timeout period of time. If the ACK is not received back within the timeout period, then the head node 6 retransmits the IP packet. The network storage layer of the stack in the server 28 must have all the data for the overall requested 6 k byte block of data before the block can be passed as a unit to the thread 37 of the database program, so that the thread of the database program in turn can add the 6 k block into the cache of key/value entries 38. The network storage protocol layer of the stack executing in the server 28 therefore must wait for the retransmission of the dropped packet before it can form the requested 6 k byte block of data, and can send that 6 k byte block of data onward to the web tier server. Such retransmissions are very undesirable and cause huge latency. In the system 1 of FIG. 1, one reason that an IP packet carrying NBD data might be dropped is that there is inadequate transmission throughput available across the PCIe bus 32 for the burst of requested NBD data being sent by the head node 6. The IP packets carrying the burst of NBD data pass into the network device 2 through the high throughput 50 Gbps network port, but they cannot pass across the lower throughput 13 Gbps PCIe bus 32 at a fast enough rate. The number of NBD data carrying packets that are buffered and waiting to be communicated across the PCIe bus 32 increases and increases, and may ultimately outstrip the buffering resources of the PCIe interface. As a result, the PCIe interface has to drop packets carrying the network storage data. A solution to this problem is desired.

In accordance with one novel aspect, each of the PCIe interfaces 24-27 includes both a PCIe transmit work queue as well as a PCIe transmit overflow queue. For PCIe interface 24, reference numeral 65 identifies the PCIe transmit work queue and reference numeral 66 identifies the PCIe transmit overflow queue. The ME processor 47 within the egress PCIe island 115 (see FIG. 7) executes a program 67 that is stored in memory 68.

In an illustrative operational example of this program, assume that initially there are pointers for IP packets in the PCIe transmit work queue 65 but there are no pointers in the PCIe transmit overflow queue 66. The PCIe transmit work queue 65 stores pointers for packets that are waiting to be sent across the PCIe bus 32 to the server 28. In accordance with the program stored in memory 68, the ME processor 47 sends a "PCIe credit request" to the DMA engine 49 in the PCIe block 48. This is represented in FIG. 7 by the arrow 72. The DMA engine 49 in turn communicates with the PCIe-Gen3 master 50, which in turn communicates with the PCIe interface circuitry of the server 28 via the Host Adaptation Layer (HAL) master 51 to check to see if there are adequate resources available for a PCIe bus transfer across PCIe bus

32. If the DMA engine 49 returns a "PCIe credit grant" to the ME processor 47, then the ME processor 47 pops the pointer from the head of the PCIe transmit work queue 65 and uses the pointer to cause the associated IP packet to be read from memory and to be communicated across the PCIe bus 32, and to be buffered into the server 28. Due to this popping, the pointer at the head of the PCIe transmit work queue 65 is deleted and the next-in-line pointer becomes the pointer at the head of the PCIe transmit work queue 65. If, on the other hand, the DMA engine 49 does not return a PCIe credit grant, then the ME processor 47 determines that there is a "PCIe congestion event." A PCIe congestion event is a condition that prevents or impedes a packet from being moved across the PCIe bus 32 such as, for example, there being inadequate buffer space available in the server 28 to receive the packet. The ME processor 47 pops the pointer from the head of the PCIe transmit work queue 65, and seeks to add the pointer onto the tail of the PCIe transmit overflow queue 24. If upon this adding the number of pointers in the PCIe transmit overflow queue 66 would exceed a drop threshold T2, then the pointer is not added and the packet is dropped. The drop threshold T2 may be expressed in various different ways, such as for example as a number of packets, or as an amount of data. The pointer is deleted from the head of the PCIe transmit work queue 65, but it is not added to the PCIe transmit overflow queue. If, however, the number of pointers in the PCIe transmit overflow queue 66 does not exceed the drop threshold T2 but it does exceed an action threshold T1, then the pointer is added to the tail of the PCIe transmit overflow queue 66 and the ME processor 47 sets the ECN-CE bit in the associated packet. If, however, the number of pointers in the PCIe transmit overflow queue 66 does not exceed either threshold T1 or T2, then the pointer is added to the tail of the PCIe transmit overflow queue 66 without the ECN-CE bit of the packet being set.

When the ME processor 47 receives a "PCIe credit grant" from the DMA engine 49, if there is both a pointer at the head of the PCIe transmit work queue 65 and a pointer at the head of the PCIe transmit overflow queue 66, then the ME processor 47 pops the pointer from the head of the PCIe transmit overflow queue 66 and causes the associated packet to be sent across the PCIe bus 32. When the ME processor 47 receives a "PCIe credit grant" from the DMA engine 49, if there is a pointer at the head of the PCIe transmit work queue 65 but no pointer at the head of the PCIe transmit overflow queue 66, then the ME processor 47 pops the pointer from the head of the PCIe transmit work queue 65 and causes the associated packet to be sent across the PCIe bus 32.

Accordingly, if there is a PCIe congestion event detected when a packet is to be sent across the PCIe bus 32 to the server 28, then a pointer to the packet is added to the tail of the PCIe transmit overflow queue and the ECN-CE bit of that packet is set if the action threshold value T1 is exceeded. How large or small the action threshold value T1 is determines the level of PCIe bus congestion required in order for an ECN-CE bit to be set. Later, when there is adequate throughput across the PCIe bus 32, the packet is sent across the PCIe bus 32 to the server 28 and is processed by the stack on the server 28. The TCP layer of the stack, in response to receiving the packet, generates an ACK packet. In accordance with the TCP protocol, if the ECN-CE bit of the packet being ACKed is set then the ECE bit in the ACK packet is also set. This ACK packet is sent back across the PCIe bus 32 and to the TCP endpoint in the head node 6. The ordinary standard TCP congestion control algorithm 69 uses the ECE bit in standard fashion as an indication of congestion, and responds in the standard manner for the congestion control algorithm used. In the example of FIG. 1, the congestion control algorithm 69 treats an ACK packet with its ECE bit set in the same way as it would treat the detection of a dropped packet, namely, the TCP window for the next transmission from the TCP endpoint in the head node 6 to the TCP endpoint in the server 28 is decreased in size. This decrease in the TCP window serves to reduce the rate of data sent by the head node 6 across the PCI interface 24 to the server 28. By reducing the rate, the chance that packets will be dropped at the PCIe interface 24 is reduced or avoided.

Importantly, the congestion event that is detected and that gives rise to the setting of the ECN-CE bit is not a congestion condition of a network interface of a network device, but rather is a congestion condition of a bus internal to a network device. More particularly, the congestion event that is detected is a PCIe congestion event. In the case of the network device 2 of FIG. 1, there may be PCIe bus congestion on one of the PCIe buses within the network device, at the same time that there is no PCIe congestion on any of the other three of the PCIe buses. A PCIe bus may have a congestion event without the network interface 46 having the type of congestion that would ordinarily be flagged using the ECN-CE bit in accordance with the TCP protocol.

Figure 13:
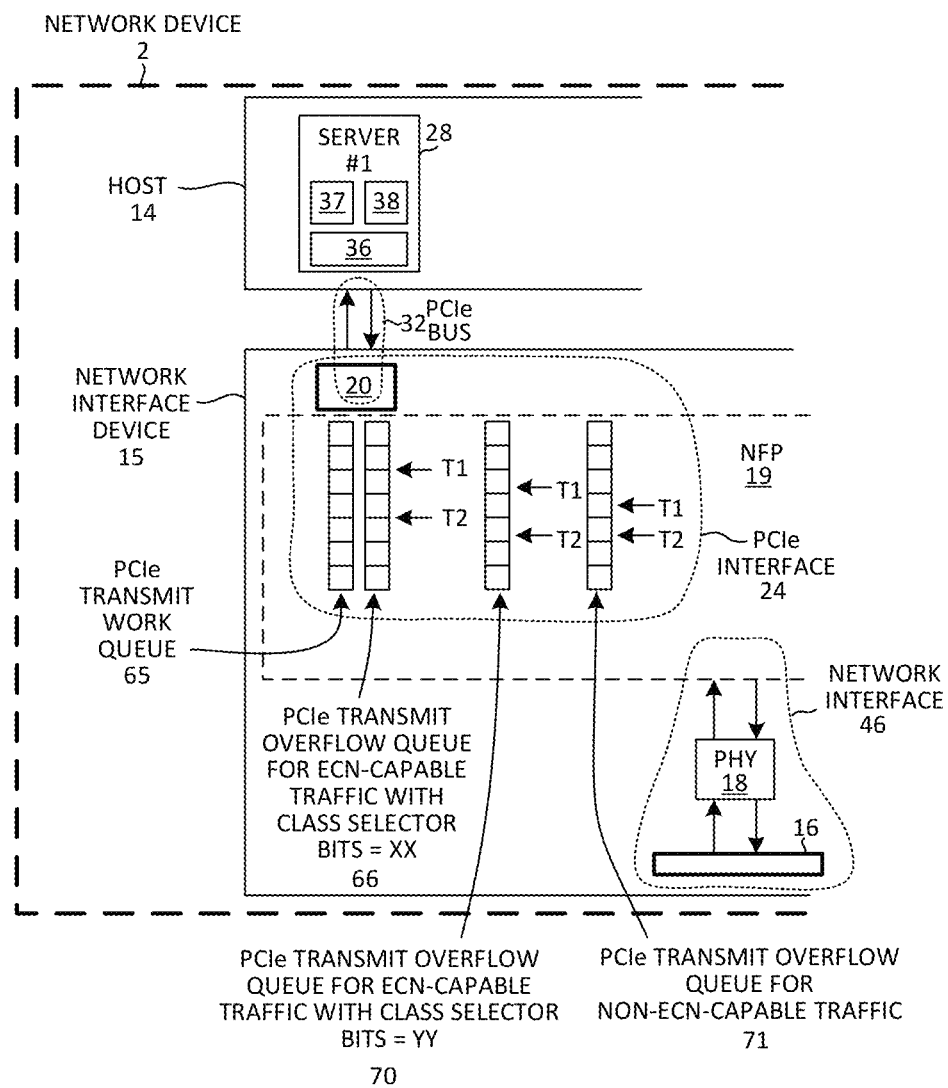
FIG. 13 is a diagram that illustrates an example of a PCIe interface that has multiple PCIe transmit overflow queues.

FIG. 13 is a diagram that illustrates another example of PCIe interface 24. Rather than the PCIe interface just having one PCIe transmit overflow queue, in this embodiment the PCIe interface 24 has multiple PCIe transmit overflow queues 66, 70 and 71. Queue 66 stores pointers for packets whose ECN-Capable Transport (ECN-CT) bit is set, and whose DSCP class selector bits have certain predetermined values. Queue 70 stores pointers for packets whose ECN-Capable Transport (ECN-CT) bit is set, and whose DSCP class selector bits have other certain predetermined values. Queue 71 stores pointers for packets whose ECN-Capable Transport (ECN-CT) bit is not set. Each of the three PCIe transmit overflow queues has its own action threshold T1 and its own drop threshold T2.

Figure 14:
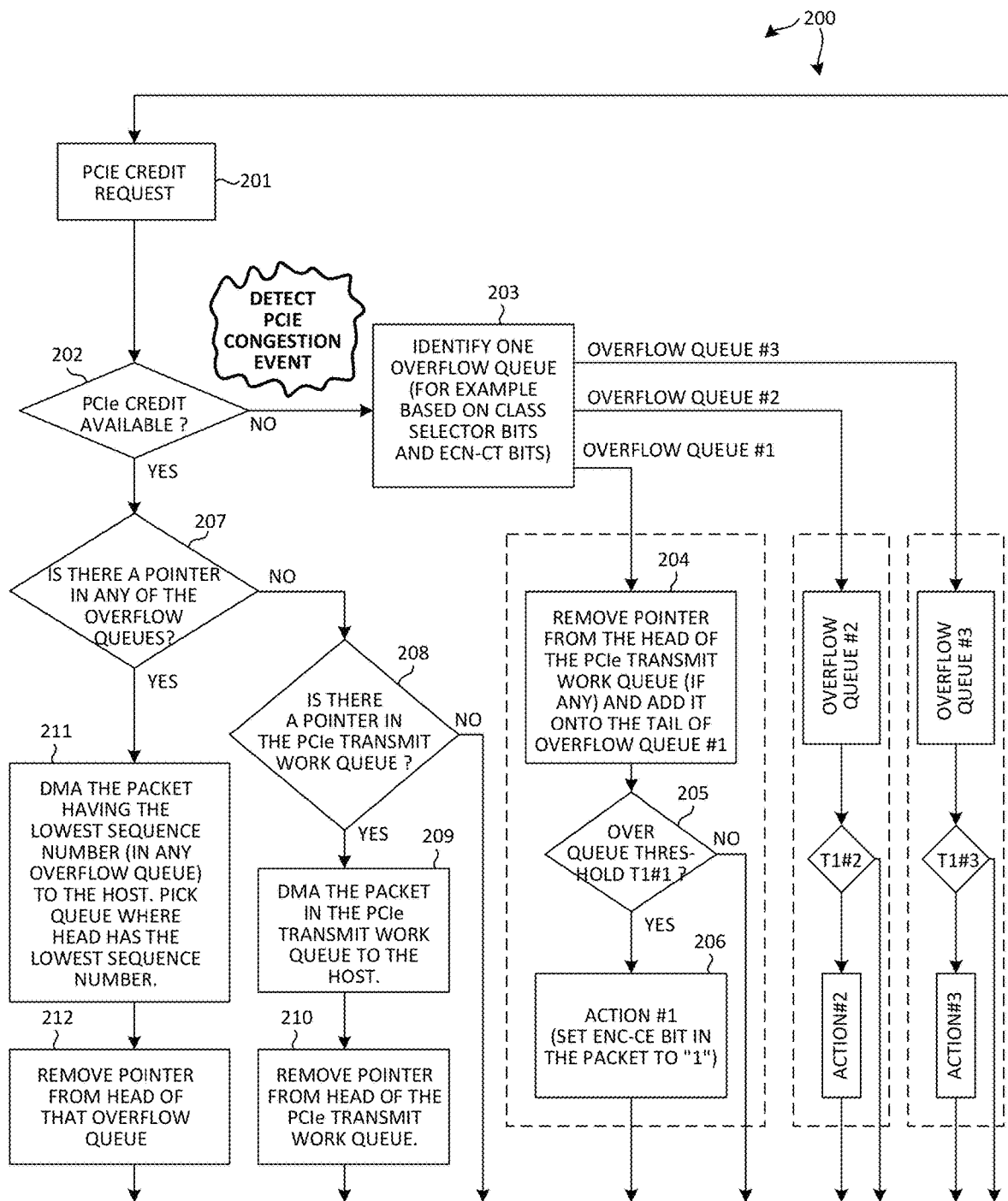
FIG. 14 is a flowchart of a method of operation of one of the PCIe interfaces of the network device of FIG. 1.

FIG. 14 is a flowchart of a method 200 of operation of the PCIe interface 24 in an example in which the PCIe interface 24 has multiple PCIe transmit overflow queues. The ME processor 47 makes a PCIe credit request (step 201) to the DMA engine 49. If the DMA engine 49 does not (step 202) return a "PCIe credit grant" (i.e., there is a "PCIe credit request denial"), then the ME processor 47 identifies (step 203) one of the PCIe transmit overflow queues. In one example, the overflow queue is determined by looking at the DSCP class selector bits and the ECN-CT bits of the packet whose pointer is at the head of the PCIe transmit work queue. If there is no such packet (whose pointer is at the head of the PCIe transmit work queue), then processing returns to step 201. In one example, this determination (step 203) identifies overflow queue #1 to be the overflow queue. The pointer at the head of the PCIe transmit work queue is removed from the head of the PCIe transmit work queue, and is added onto the tail of the identified PCIe transmit overflow queue. If the adding of the pointer onto the tail of the identified overflow queue results in the action threshold value T1 of that overflow being exceeded (step 205), then a level of PCIe congestion has been detected. If this level of PCIe congestion is detected, then a predetermined action is taken (step 206). This action is specific to the particular overflow queue. In one example, this action is the setting of the ECN-CE bit in the packet (in the packet whose pointer was just added onto the tail of overflow queue #1). If the action threshold value T1 is not exceeded (step 205), then the predetermined action is not taken. Processing then returns to step 201.

At step 202, if the DMA engine returns a "PCIe credit grant", then processing proceeds to determine (step 207) if there is a pointer in the head of any of the PCIe transmit overflow queues. If there is such a pointer, then the packet whose pointer has the lowest sequence number of all the pointers at the heads of all the overflow queues is DMA transferred (step 211) to the server 28 across the PCIe bus 32. The pointer to that packet is removed from the head of the PCIe transmit overflow queue where it was stored. If, however, it is determined at step 207 that there is no pointer in any of the overflow queues, then the PCIe transmit work queue is checked. If there is a pointer at the head of the PCIe transmit work queue (step 208), then its corresponding packet is DMA transferred to the server 28 across the PCIe bus 32. The pointer to that packet is removed from the head of the PCIe transmit work queue. If it is determined (step 208) that there is no pointer at the head of the PCIe transmit work queue, then no action is taken, and processing returns to step 201. Note that each of the different PCIe transmit overflow queues has its own action threshold T1 value, and has its own action. Due to limitations of space in the illustration of FIG. 14, the testing for the drop threshold T2 and the associated drop action is not shown in the sequences of steps performed once an overflow queue is identified in step 203. Nonetheless, in each sequence of steps, it is determined if the adding of the pointer onto the tail of the PCIe transmit overflow queue would result in the drop threshold T2 of that queue being exceeded. If the drop threshold T2 would be exceeded, then the pointer is not added, and the packet is dropped. Dropping means that there is no longer any pointer to the packet stored in any queue of the PCIe interface 24 and that the buffer space (memory space) used to store the packet is freed so that it can be used to store another packet. The dropped packet will not be passed across the PCIe bus 32 to the server 28.

Although certain specific embodiments are described above for instructional purposes, the teachings of this patent document have general applicability and are not limited to the specific embodiments described above. Each PCIe interface could have many interrupt request queues (for example, thirty-two interrupt request queues), and for each interrupt request queue there is a set of queues (including a transmit queue such as queue 65, and one or more overflow queues such as queue 66). Although a specific embodiment of the invention is described above that involves flagging the detected internal bus congestion condition by setting a particular bit (the ECN-CE bit) in a particular type of packet (an IP packet), the invention is more general than this in that other ways of flagging the internal bus congestion condition may be used with that flagging resulting in the congestion control algorithm (employed in the sending device) being notified such that the sending device is made to respond by slowing the rate of data transfer that passes across the internal bus. Although an example is set forth above where the internal bus is the PCIe bus, the invention is more general than this in that the invention applies to other types of internal buses that might be internal to a receiving network device. The novel method of flagging applies to currently employed congestion control algorithms used in sending devices, as well as to congestion control algorithms that may be developed in the future for use in such sending devices. Accordingly, various modifications, adaptations, and combinations of various features of the described embodiments can be practiced without departing from the scope of the invention as set forth in the claims.

What is claimed is:

1. In a system that includes a host computer and a Network Interface Device (NID), wherein the NID is coupled to the host computer via a Peripheral Component Interconnect Express (PCIe) bus, wherein the NID has a network port, a method comprising:
   (a) receiving an IP packet onto the NID via the network port, and storing the IP packet in the NID;
   (b) detecting a PCIe bus congestion condition, wherein the PCIe bus congestion condition is a condition of the PCIe bus;
   (c) in response to the detecting of (b) changing a value of an Explicit Congestion Notification (ECN-CE) bit in the IP packet; and
   (d) causing the IP packet with the value of its ECN bit as changed in (c) to be transferred across the PCIe bus from the NID to the host computer.

2. The method of claim 1, wherein the IP packet is transferred across the PCIe bus in (d) only after there is a PCIe credit to transfer the IP packet across the PCIe bus from the NID to the host computer.

3. The method of claim 1, wherein the network port is a physical network port for engaging with a plug end of a network cable, wherein the NID comprises a network interface that includes the physical network port, and wherein the PCIe bus congestion condition is not a condition of the network interface.

4. The method of claim 1, further comprising:
   maintaining a first PCIe transmit overflow queue of pointers on the NID, wherein pointers stored in the first PCIe transmit overflow queue point to IP packets, and wherein the IP packets to which the pointers in the first PCIe transmit overflow queue point are destined for transfer across the PCIe bus from the NID to the host computer, and wherein the PCIe bus congestion condition detected in (b) is a condition in which both: 1) there is not enough PCIe credit to transfer the IP packet across the PCIe bus from the NID to the host computer, and 2) placing a pointer to the IP packet into the first PCIe transmit overflow queue would result in an action threshold value for the first PCIe transmit overflow queue being exceeded.

5. The method of claim 4, wherein the NID maintains a drop threshold value associated with the first PCIe transmit overflow queue, wherein if a pointer to an IP packet that would otherwise have been placed into the first PCIe transmit overflow queue would result in the drop threshold value being exceeded then the IP packet is dropped and the pointer to the IP packet is not placed into the first PCIe transmit overflow queue.

6. The method of claim 4, further comprising:
   maintaining a second PCIe transmit overflow queue of pointers on the NID, wherein the second PCIe transmit overflow queue is for storing pointers to IP packets of non-ENC-capable traffic destined for transfer across the PCIe bus from the NID to the host computer.

7. In a system that includes a host computer and a Network Interface Device (NID), wherein the NID is coupled to the host computer via a Peripheral Component Interconnect Express (PCIe) bus, wherein the NID has a physical network port, a method comprising:
   (a) maintaining a first PCIe transmit overflow queue of pointers on the NID, wherein the pointers of the first PCIe transmit overflow queue point to IP packets, wherein the IP packets having pointers stored in the first PCIe transmit overflow queue are destined for transfer across the PCIe bus from the NID to the host computer;

(b) maintaining a second PCIe transmit overflow queue of pointers on the NID, wherein the pointers of the second PCIe transmit overflow queue point to IP packets, wherein the IP packets having pointers stored in the second PCIe transmit overflow queue are destined for transfer across the PCIe bus from the NID to the host computer;

(c) receiving a first IP packet onto the NID via the physical network port, and storing the first IP packet in the NID, wherein the first IP packet as it is received onto the NID has an Explicit Congestion Notification Congestion Experienced (ECN-CE) bit that is not set;

(d) detecting a congestion condition of the PCIe bus;

(e) as a result of the detecting of (d) placing a pointer to the first IP packet onto the first PCIe transmit overflow queue;

(f) removing the pointer to the first IP packet from the first PCIe overflow queue and transferring the first IP packet across the PCIe bus from the NID to the host computer, wherein the ECN-CE bit of the first IP packet is set when the first IP packet is transferred across the PCIe bus in (f);

(g) receiving a second IP packet onto the NID via the physical network port, and storing the second IP packet in the NID, wherein the second IP packet as it is received onto the NID has an ECN-CE but that is not set;

(h) detecting a congestion condition of the PCIe bus;

(i) as a result of the detecting of (h) placing a pointer to the second IP packet onto the second PCIe transmit overflow queue; and (j) removing the pointer to the second IP packet from the second PCIe overflow queue and transferring the second IP packet across the PCIe bus from the NID to the host computer, wherein the ECN-CE bit of the second IP packet is set when the second IP packet is transferred across the PCIe bus in (j).

8. The method of claim 7, further comprising:

(k) making a first level of congestion determination of the PCIe bus and setting the ECN-CE bit of the first IP packet as a result of the first level of congestion determination; and (l) making a second level congestion determination of the PCIe bus and setting the ECN-CE bit of the second IP packet as a result of the second level of congestion determination.

9. A Network Interface Device (NID), comprising:
a physical network port through which IP packets can be communicated into and out of the NID;
a bus interface for coupling the NID via a bus to a server computer; and
means for: (a) receiving an IP packet onto the NID via the physical network port, wherein the IP packet as received onto the NID has an Explicit Congestion Notification Congestion Experienced (ECN-CE) bit that is not set, (b) detecting a bus congestion condition of the bus and in response to the detecting of the bus congestion condition storing a pointer to the IP packet into a selected one of a plurality of bus transmit overflow queues maintained on the means, (c) reading the pointer out of the selected bus transmit overflow queue and using the pointer to transfer the IP packet out of the NID via the bus interface so that the IP packet is transferred across the bus to the server computer, wherein the ECN-CE bit of the IP packet as the IP packet as transferred to the server computer is set.

10. The NID of claim 9, wherein the bus is a Peripheral Component Interconnect Express (PCIe) bus, and wherein the bus interface comprises a PCIe card edge connector.

11. The NID of claim 9, wherein the means sets the ECN-CE bit as a result of the detecting of the bus congestion condition.

12. The NID of claim 9, wherein the means determines that the ECN-CE bit should be set as a function of a number of pointers in the selected bus transmit overflow queue and a threshold value.

13. The NID of claim 9, wherein the means is also for: (d) maintaining a bus transmit work queue, wherein the pointer to the IP packet is removed from the bus transmit work queue and is stored into the selected bus transmit overflow queue in response to the detecting of the bus congestion condition.

14. The NID of claim 9, wherein the means is also for: (d) maintaining an action threshold value for the selected bus transmit overflow queue.

15. The NID of claim 9, wherein the means is also for: (d) maintaining both an action threshold value as well as a drop threshold value for the selected bus transmit overflow queue.

16. The NID of claim 9, wherein the means stores pointers to packets of ECN-capable traffic into one of the bus transmit overflow queues but does not store pointers to packets of non-ECN-capable traffic into said one of the bus transmit overflow queues.

17. The NID of claim 9, wherein the means determines the selected one of the plurality of bus transmit overflow queues based at least in part on a value of a Explicit Congestion Notification Congestion Capable Transport (ECN-CT) bit of the IP packet.

18. The NID of claim 9, wherein the bus is a Peripheral Component Interconnect Express (PCIe) bus.

19. The NID of claim 9, further comprising:
a second bus interface for coupling the NID via a second bus to a second server computer, wherein the means is also for: (d) receiving a second IP packet onto the NID via the physical network port, wherein the second IP packet as received onto the NID has an ECN-CE bit that is not set, (e) detecting a second bus congestion condition and in response to the detecting of the second bus congestion condition storing a pointer to the second IP packet into a selected one of a second plurality of bus transmit overflow queues maintained on the means, (f) reading the pointer to the second IP packet out of the selected one of the second plurality of bus transmit overflow queues and using the pointer to the second IP packet to transfer the second IP packet out of the NID via the second bus interface so that the second IP packet is transferred across the second bus to the second server computer, wherein the ECN-CE bit of the second IP packet as the second IP packet as transferred to the second server computer is set.

20. The NID of claim 9, wherein the detecting of the bus congestion condition of the bus includes making a bus transfer credit request.

21. In a system that includes a host computer and a Network Interface Device (NID), wherein the NID is coupled to the host computer via a bus, wherein the NID has a network port, a method comprising:

(a) receiving an IP packet onto the NID via the network port, and storing the IP packet in the NID;

(b) detecting a bus congestion condition, wherein the bus congestion condition is a condition of the bus;

(c) in response to the detecting of (b) changing a value of an Explicit Congestion Notification (ECN-CE) bit in the IP packet; and
(d) causing the IP packet with the value of its ECN bit as changed in (c) to be transferred across the bus from the NID to the host computer.

* * * * *